J. W. F. HOW.

Improvement in Animal Traps.

No. 124,821. Patented March 19, 1872.

Witnesses.
O. H. Poole.
A. S. Dinsmore

Inventor.
Jas. W. F. How
by J. Mc. Perkins
his Atty.

125,821

UNITED STATES PATENT OFFICE.

JAMES WILLIAM FISHBACK HOW, OF CANYONVILLE, OREGON.

IMPROVEMENT IN ANIMAL-TRAPS.

Specification forming part of Letters Patent No. 124,821, dated March 19, 1872.

*To all whom it may concern:*

Be it known that I, JAMES WILLIAM FISHBACK HOW, of Canyonville, in the county of Douglas and State of Oregon, have invented certain new and useful Improvements in Animal-Traps; and do hereby declare the following to be a full, clear, and exact description thereof, reference being had to the accompanying drawing and to the letters of reference marked thereon.

My present invention is intended as an improvement upon the animal-trap for which Letters Patent were granted to me March 28, 1871; and it consists, first, in a different and improved construction of the catching-wheel; and second, in an improved construction of the dumping-wheel.

In order to enable others skilled in the art to which my invention appertains to make and use the same, I will now proceed to describe its construction and operation, referring to the annexed drawing which forms a part of this specification, and in which—

Figure 1:
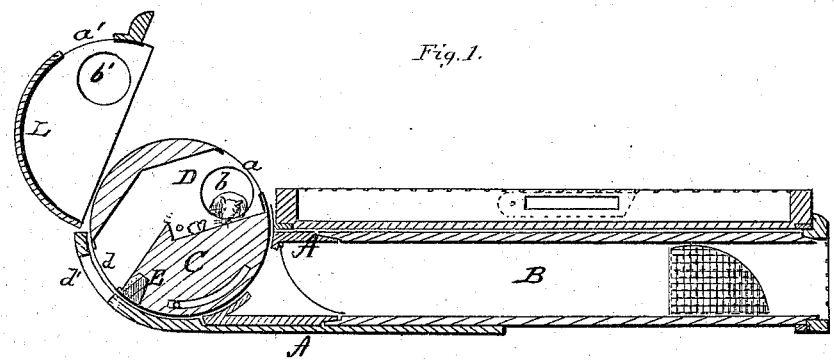
Figure 2:
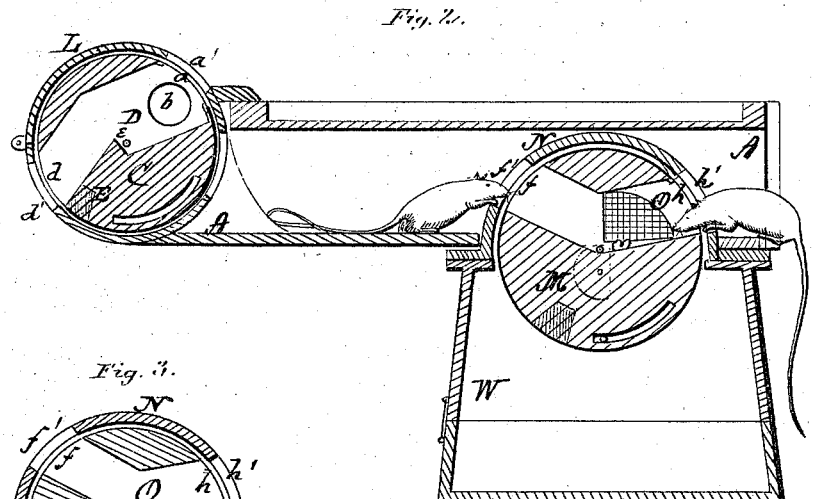

Figure 1 is a longitudinal vertical section of my trap, showing it used with the drawer. Fig. 2 is a similar section, showing my trap used with the dumping-wheel and water-tank; and Fig. 3 is a section of said dumping-wheel and tank alone.

In this application I do not deem it necessary to more than mention and letter such parts of my trap as have not been changed, as their construction and operation have been fully set forth in my former patent above referred to.

A represents the box, with sliding drawer B and top and side bait-holders. C is the catching-wheel, with cavity D, counter-balance E, and shell or casing L. M is the dumping-wheel, having cavity O and water receptacle or tank W. In my former patent the animal could only enter the cavity D in the catching-wheel C one way, namely, through the opening $a$ and the corresponding opening $a'$ in the shell L. In this case I have added three more openings in as many different directions, through which the animal may enter the wheel and be thrown into the trap. In each side of the wheel C leading into the cavity D is an opening, $b$, with corresponding opening $b'$ in the casing L. An entrance, $d'$, is then formed through the end of the box A, immediately above the bottom, corresponding with an opening, $d$, leading through the wheel into the main cavity D. When the animal passes through this opening and comes to the center there is a step, $e$, for the animal to jump down before it can reach the bait, and hence must turn the wheel around on its axis sufficiently to throw the animal into the trap. All the entrances are constructed in a similar manner, so as to necessitate a step or jump on the part of the animal before it can reach the bait.

Figure 3:
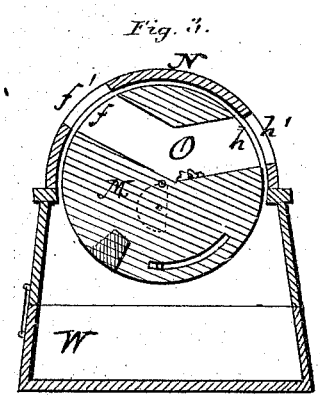

The other part of my invention relates to the dumping-wheel, which I have constructed in such a manner that it may be used either separately, as shown in Fig. 3, or with the other trap, as shown in Fig. 2. This is accomplished by extending the shield N entirely over the top of the wheel M. I also form two openings or entrances, $f$ and $h$, to the cavity O in said wheel, with corresponding openings $f'$ and $h'$ in the shield N. When the wheel M is used alone as a trap it may be provided with side openings, the same as above described for the catching-wheel C.

Having thus fully described my invention, what I claim as new, and desire to secure by Letters Patent, is—

1. The catching-wheel C, having a cavity, D, with four openings or entrances, $a$, $b$, $c$, and $d$, into said cavity from different directions, and corresponding openings in the casing inclosing said wheel, substantially as herein set forth.

2. The combination of the wheel M, having cavity O with openings $f\ h$, the water-tank W, and shield or casing N with openings $f'\ h'$, all substantially as and for the purposes herein set forth.

In testimony that I claim the foregoing I have hereinto set my hand this 21st day of November, 1871.

JAMES WILLIAM FISHBACK HOW,

Witnesses:
G. L. DEAN,
VOLNEY COLUG.